United States Patent Office 2,761,636
Patented Sept. 4, 1956

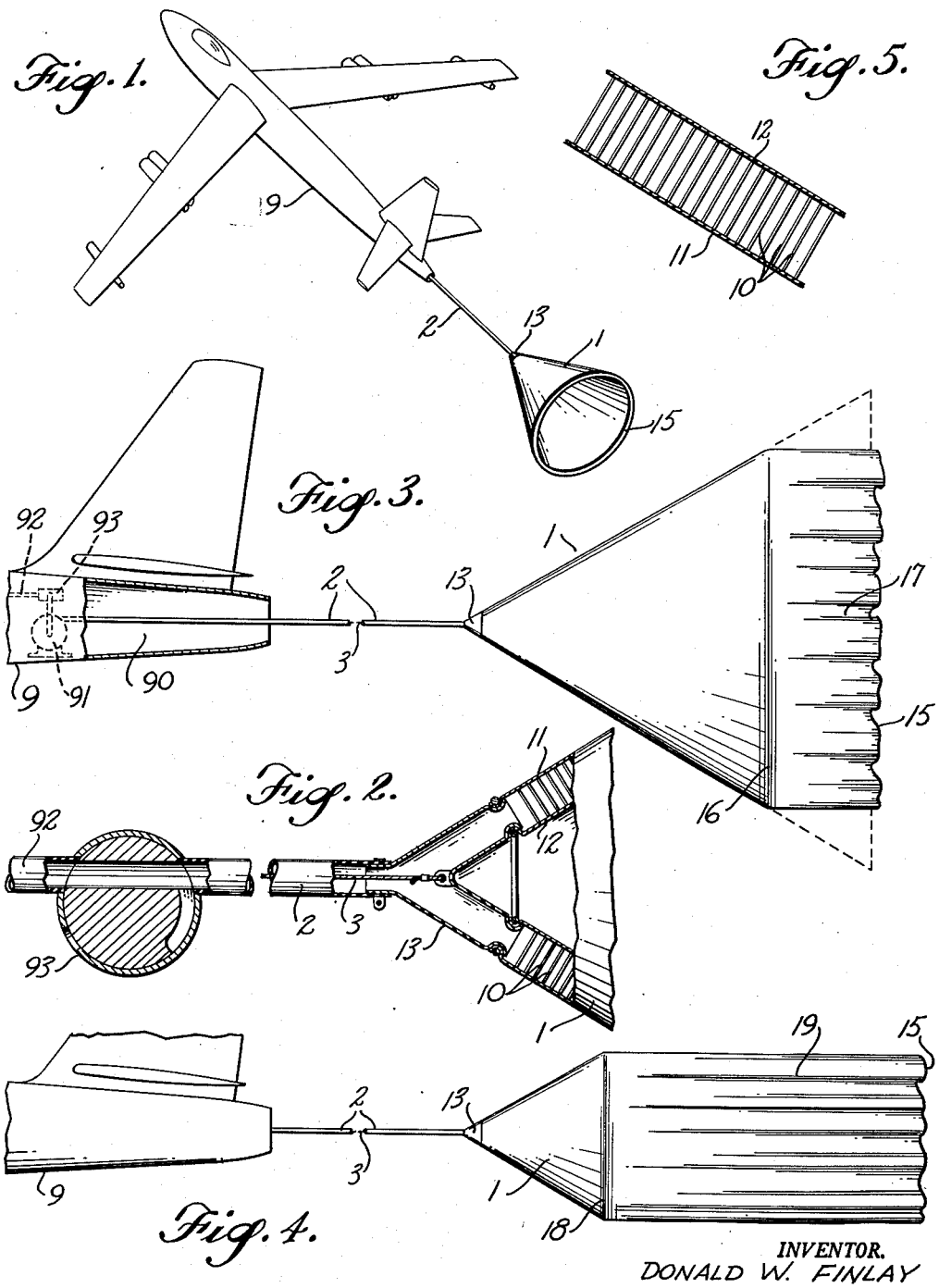

2,761,636

VARIABLE AREA DRAG CHUTE

Donald W. Finlay, Seattle, Wash., assignor to Boeing Airplane Company, Seattle, Wash., a corporation of Delaware Application January 27, 1953, Serial No. 333,507

4 Claims. (Cl. 244—113)

When it was discovered that it was practicable to employ parachute canopies to slow down an airplane to decrease its landing speed, or to assist the brakes in stopping the airplane after touching down, the parachute employed was a large size canopy of normal design, such as is utilized for dropping large, heavy pieces of freight. Obviously it would be impracticable to make the area, and hence the drag effect, of such canopies variable to accommodate different airplanes and different landing or flying speeds, and the like, and neither is it practicable to retract such canopies within the aircraft ready for use a second time, as would be highly desirable if such a drag chute were used during flight. Instead, such canopies of normal design must be released, retrieved, and repacked before they can be reinstalled upon the airplane for re-use.

The present invention has for its general object the imposition of a variable drag upon an airplane, and more specifically the provision of a drag chute, especially designed for reducing the landing speed of an aircraft, or for stopping it quickly when ground-borne or even usable during flight, as in refueling a fast airplane from a slow tanker airplane, and one which is variable in frontal area, and hence in drag-producing effect. It is also an object to provide such a drag chute which is capable of being withdrawn into the aircraft structure even while in flight, ready for re-use without any necessity for retrieving, repacking, etc.

In the accompanying drawings the invention is shown in a preferred form of embodiment, although it will be understood that the mechanism for retracting it into the airplane, and for controlling its degree of inflation, are intended to represent any suitable means, and are only diagrammatically shown.

Figure 1 is a perspective view of an aircraft from above, illustrating the drag chute of this invention in full operative use.

Figure 2 is an axial sectional view through the apex of such a drag chute, illustrating the draft means and the inflating means.

Figure 3 is a side elevational view of the tail portion of the airplane and a drag chute behind the same partially but nearly wholly inflated, and Figure 4 is a similar view showing the drag chute only slightly inflated.

Figure 5 is a transverse sectional detail on an enlarged scale showing the twin-wall construction of such a drag chute.

The aircraft is indicated generally by the numeral 9, and at its tail end is provided with a recess 90 within which a drag chute may be stored ready for use. A winch 91 or any equivalent device is carried within the aircraft, in a position at the forward end of the recess 90, and an air hose 92 with a control valve 93 are also located within the aircraft structure, the valve 93 being operatively connected through the hub of the winch 91 with the hose line 2, later to be described, which extends to the drag chute. The airplane illustrated is a high-speed type, for it is such aircraft as these which particularly need a drag chute to slow down their landing speed and to check their forward motion once they are ground-borne, or to slow them down for refueling operations.

The drag chute comprises a cone, illustrated generally at 1 in Figure 1. This is oriented with its apex forwardly and its base to the rear, or trailing. It has double flexible sheet walls, such as the outer wall 11 and the inner wall 12, joined together by a multitude of spaced tension elements 10 whereby the space between these walls may be inflated, but the walls are held, when inflated, in general parallelism. The tension elements 10 will be preferably a multiplicity of cords, or might be a plurality of pervious webs or sheets of material, joining the inner and outer walls and preventing any appreciable distention of the inner wall inwardly from the outer wall when a fluid under pressure is admitted to the space between such walls. It is preferred that the cone be hollow, that is to say, that it have no base, but be open through the base to its interior. The space between the walls 11 and 12 is closed about the trailing edge circle, at 15, however, by an impervious wall.

At its forward end or apex the cone is provided with a fitting 13 by which it is connected to the hose line 2, which extends forwardly to the winch 91. Also attached to the fitting at 13 is a cable 3 which constitutes the actual tension device, or drag line, so that the hose 2 need not constitute the means of communicating the drag of the drag chute to the aircraft. The hose 2, therefore, constitutes merely means to inflate the space between the walls 11 and 12, and the inflation is accomplished from any suitable source of air or other gas under pressure under control of the pilot by the manipulation of the control 92 connected to move the valve 93. Such gas is not selected for its buoyancy but is used solely for its pressurizing action.

A large airplane, landing at high speed, has more momentum to be resisted by the drag chute than has the same airplane when landing at a lower speed (as when resisted by a high head wind), or than has a smaller airplane at the same landing speed. The drag chute for any particular airplane would be selected as one capable of producing the maximum drag desired under the conditions productive of maximum momentum, and yet must be capable of producing a lesser drag under conditions when the airplane's momentum is less, or even of decreasing its drag while the airplane's momentum is decreasing, to ease the airplane to a stop.

Assuming, then, that drag to be afforded by the chute is desired, the cable 3 is slacked off to allow the drag chute to emerge from its recess 90 (positive means to eject it, as is common in parachute packs, may be employed if required) and to trail behind the airplane. Initially it will trail behind as a fluted, collapsed, elongated mass of little frontal area. Its inflation commences, through the valve 93 and hose line 2, progressing rearwardly from the leading conical tip. The uninflated portion behind the inflated portion will still trail behind for the reason that the pressure of the air stream will resist and prevent distention of any rearward portion until the pressure of the gas between walls 11 and 12 has increased sufficiently to sustain such portion. This condition is illustrated in Figure 4. As the pressure in the entire space between walls 11 and 12 builds up, the air stream resistance is increasingly overcome, the drag chute inflates farther and farther back, and its frontal area increases, as can be seen by comparison of Figures 4 and 3, until eventually the pressure of the gas between the walls is great enough so that the chute is fully inflated and distended in conical form to its base, as seen in Figure 1. In this condition the chute produces maximum drag, the base 15, expanded to its greatest size, being principally responsible for this result.

Inflation of the space between the outer wall 11 and the inner wall 12 converts this double-walled formation into a load-resisting structure. The greater the gas pressure in the space between these walls, the greater is the load-carrying ability of the double-walled conical structure. The load imposed on this structure is produced by the impact of the air stream on the outer wall of the cone as it is drawn through the air. The force of the air stream striking the cone exerts a force component in compression normal to the surface of the cone, and the larger the cone angle the greater is this component of the air stream. Also, the larger the circumference of any selected circular element of the cone, the greater will be the circumferential compressive force produced by the inwardly directed component of the force resulting from the air flow.

It follows, therefore, that the portion of the drag cone of largest circumferential extent will be the last portion to be distended against the force of the air stream and the first portion to be collapsed when the pressure in the space between the walls decreases or the pressure of the air stream increases. Consequently, the trailing end of the cone will be the last portion of the cone to be distended and the first portion to collapse as the pressure in the space between the walls is reduced. Because of the rearwardly flaring character of the drag chute shape, it will be progressively distended from its leading end as the gas pressure between the walls increases in the manner described above, and, conversely, the chute will collapse progressively forward as the gas pressure between the walls decreases.

Once the airplane has touched down and its speed has decreased somewhat, it may be desirable to decrease the drag. In such case the valve 93 is manipulated to decrease the air pressure between the walls of the drag chute; the air stream will still have enough force to collapse the rearmost portions of the chute, and only the forward remainder, back to some circle intermediate the apex at 13 and the base at 15, will remain inflated. The lower the inflation pressure, the lesser the frontal drag area that is presented to the air stream. Accordingly, there is provided a drag chute of variable area, adapted to changing or different conditions on a given airplane, or usable with different airplanes.

While the cone is inflated, and in the portion which is distended, the tension elements 10 tied to the outer wall 11 will restrain the inner wall from merely bulging inward, so that the pressure within the space between them tends to hold the chute distended.

When the need for the chute is past it may be deflated completely and drawn forwardly again into the recess 90. Since when deflated its entire wall structure will collapse and fold inwardly into a long narrow form, it is obvious that it can be drawn within the recess, and there be ready for emergence a second time, and reinflation into operative condition.

I claim as my invention:

1. A drag chute comprising a double-walled body of flexible material, inflatable between its walls and of a shape to flare rearwardly, of a size such that when fully distended it will produce an effective momentum-reducing drag upon an aircraft, means connected to the leading end of said body to drag the body behind such an aircraft, means operable to supply gas under pressure to the space between the double walls for distending the body, and means operable to vary the gas pressure within such space, to vary correspondingly the degree of distension of said body, and consequently its total effective drag.

2. The drag chute defined in claim 1, including a multiplicity of tension elements interconnecting the double walls of the body to limit separation thereof.

3. A drag chute comprising a cone of a size sufficiently large, when fully distended, to produce an effective momentum-reducing drag upon an aircraft, and having an open base, and having inner and outer walls of material which is substantially equally flexible throughout, said inner and outer walls defining a closed, inflatable space; means connected to the apex of said cone to drag the same behind an airplane, with its open base to the rear, and means for the inflation of such space to various selected pressures, to vary the frontal area of said cone, and hence its effective drag, in accordance with the degree of inflation.

4. The drag chute defined in claim 3, including multitudinous tension cords interconnecting the cone's inner and outer walls throughout such inflatable space.

References Cited in the file of this patent

UNITED STATES PATENTS

| | | |
|---|---|---|
| 1,328,848 | Ramauge | Jan. 27, 1920 |
| 2,287,257 | Lear | June 23, 1942 |
| 2,513,867 | Heffernan | July 4, 1950 |
| 2,553,642 | Eaton | May 22, 1951 |